United States Patent
Cordova

(10) Patent No.: US 6,672,566 B2
(45) Date of Patent: Jan. 6, 2004

(54) MULTI-USE STERILE ACCESS/GMP DIAPHRAGM VALVE HOUSING

(75) Inventor: Ricardo Martin Cordova, Arleta, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 233 days.

(21) Appl. No.: 10/008,161

(22) Filed: Nov. 13, 2001

(65) Prior Publication Data

US 2003/0089876 A1 May 15, 2003

(51) Int. Cl.[7] ................................................. F16K 7/20
(52) U.S. Cl. ..................... 251/331; 137/15.21; 137/861
(58) Field of Search ......................... 251/331; 137/861, 137/883, 884, 15.18, 15.21

(56) References Cited

U.S. PATENT DOCUMENTS

| | | | |
|---|---|---|---|
| 5,273,075 A | 12/1993 | Skaer | |
| 5,427,150 A | 6/1995 | Skaer et al. | |
| 5,549,134 A | 8/1996 | Browne et al. | |
| 5,657,786 A | 8/1997 | DuRoss et al. | |
| 5,755,155 A | 5/1998 | Buesing | |
| 5,906,223 A | 5/1999 | Pinkham | |
| 6,032,690 A | * 3/2000 | Weissfloch et al. | 251/331 X |
| 6,112,767 A | 9/2000 | Pinkham | |
| 6,155,535 A | * 12/2000 | Marcilese | 251/331 |
| 6,237,637 B1 | * 5/2001 | Kovacs et al. | 137/883 |
| 6,250,332 B1 | 6/2001 | Backlund | |
| 6,397,887 B1 | * 6/2002 | Crissman et al. | 137/597 |
| 6,401,756 B1 | * 6/2002 | Crissman et al. | 137/883 X |

OTHER PUBLICATIONS

Pure–Flo, *High Purity Diaphragm Valves*, entire catalogue, 90 pages, published 1999.

* cited by examiner

*Primary Examiner*—Gene Mancene
*Assistant Examiner*—Eric Keasel
(74) *Attorney, Agent, or Firm*—Stetina Brunda Garred & Brucker

(57) ABSTRACT

A multi-use sterile access/GMP diaphragm valve housing having a valve housing block having a main flow axis. The housing having a main flow valve mounting surface formed parallel to the main flow axis. The housing having a first port and an opposing second port. The housing having a first passage extending from the first port to the main flow valve mounting surface. The housing having a second passage extending from the main flow valve mounting surface to the second port. The housing having a main flow weir between the first and second passages. The housing having first and second planar lands formed upon the valve housing block adjacent the first passage for forming a third passage through a respective one of the lands in fluid communication with the first passage. The first and second planar lands are disposed orthogonal to each other and parallel to the main flow axis.

13 Claims, 6 Drawing Sheets

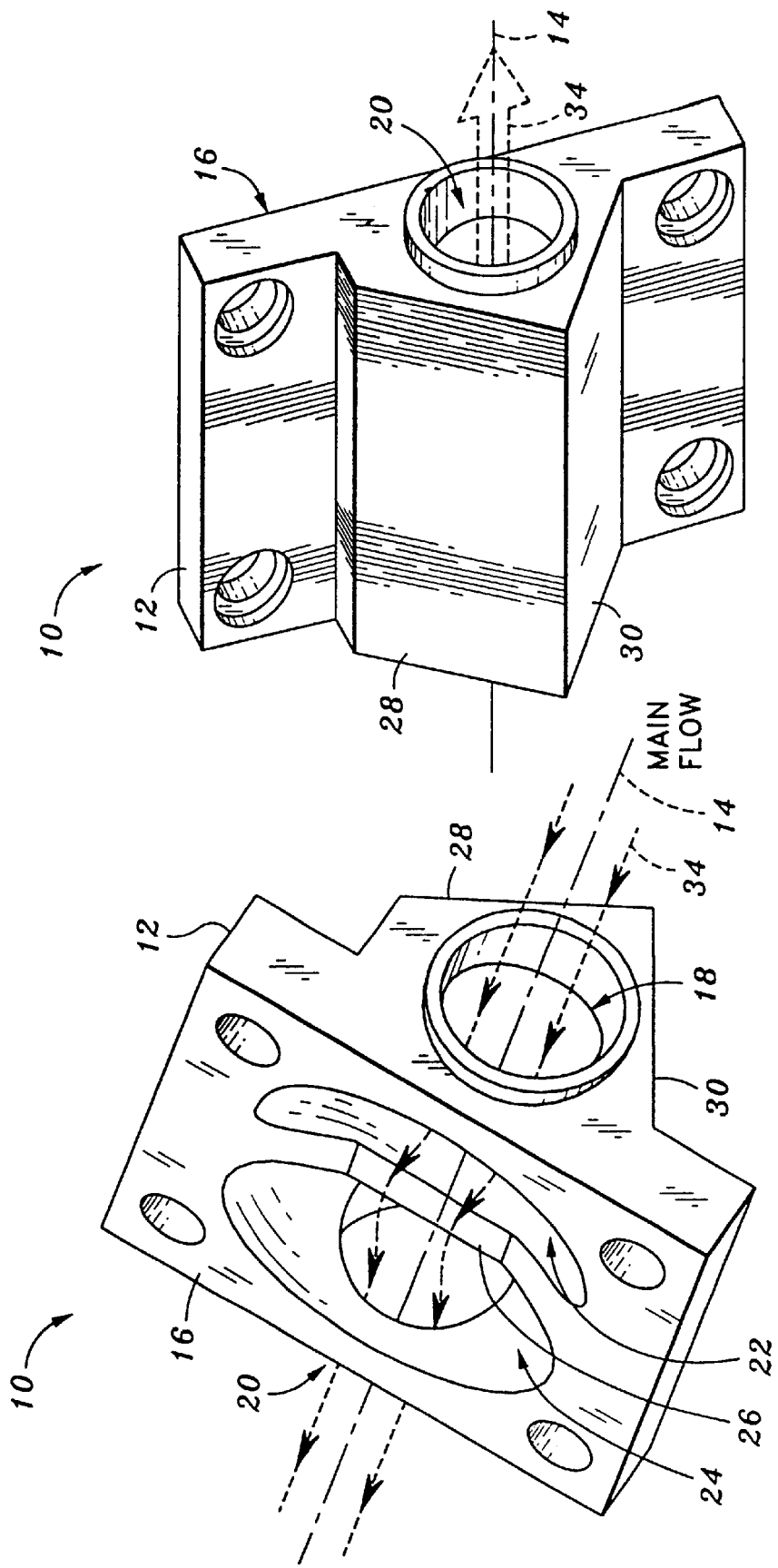

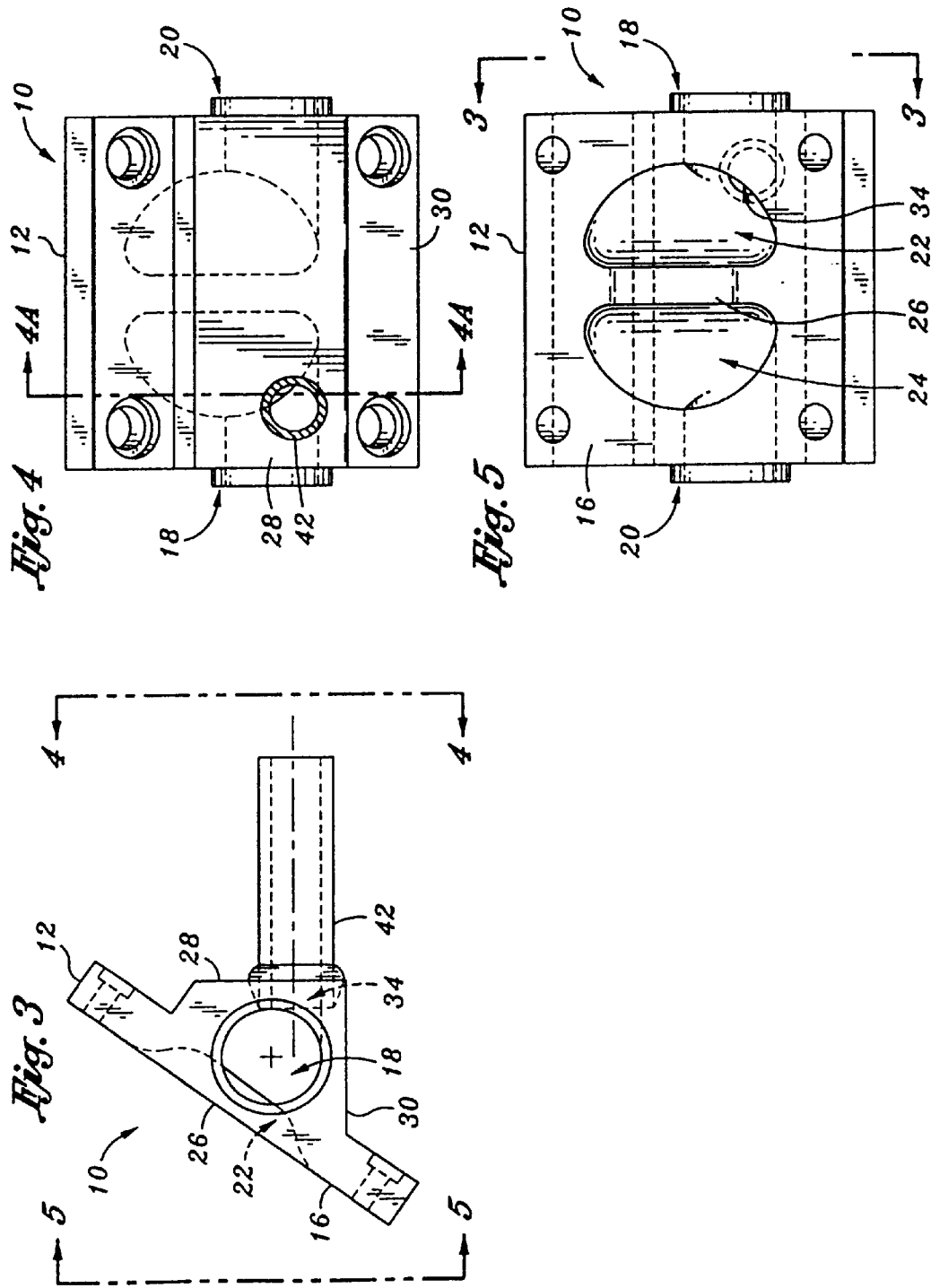

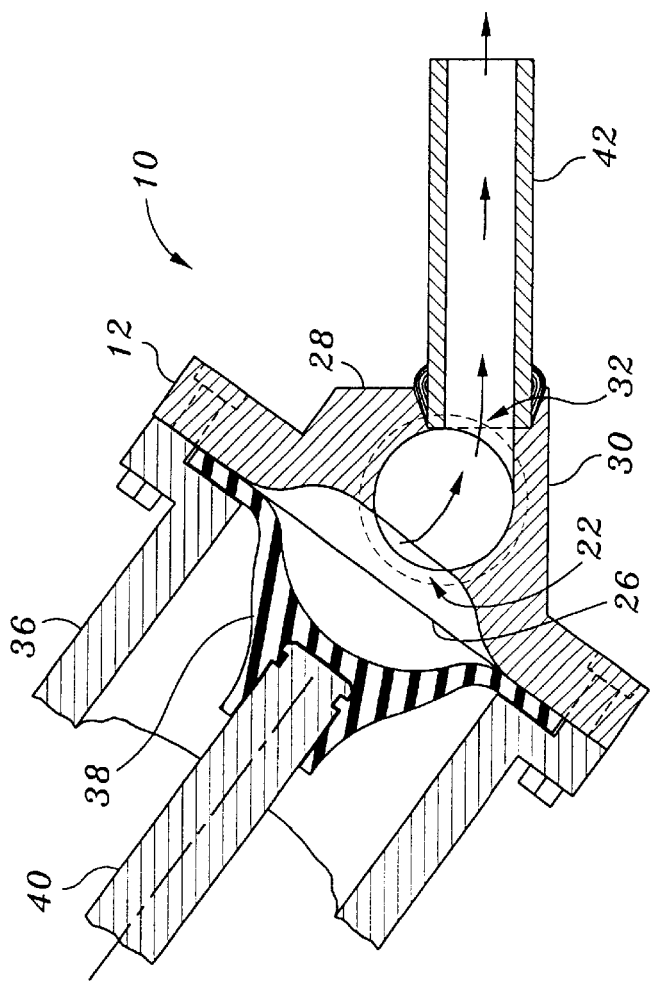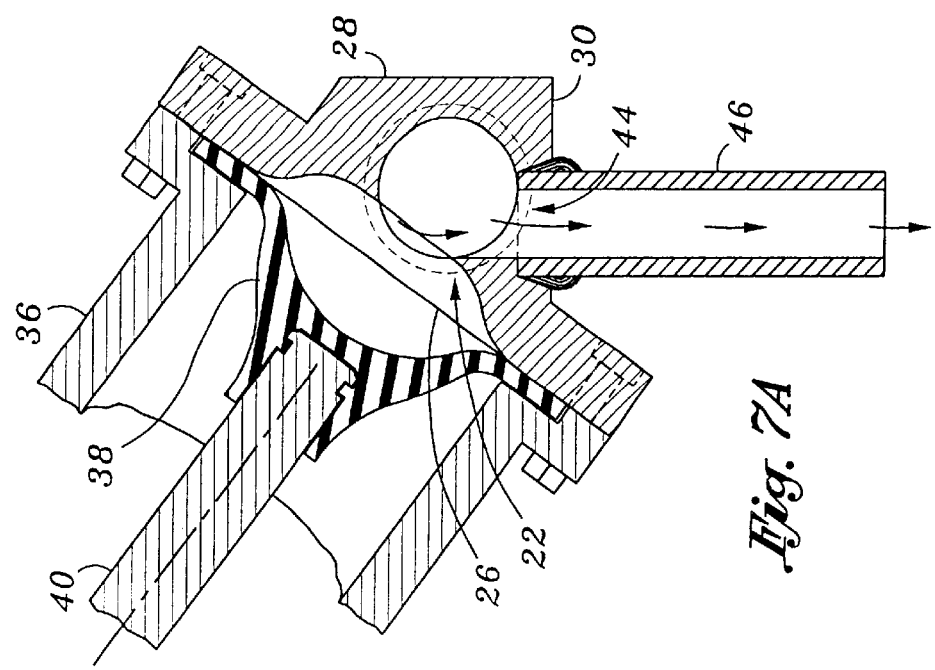
Fig. 4A
Fig. 7A

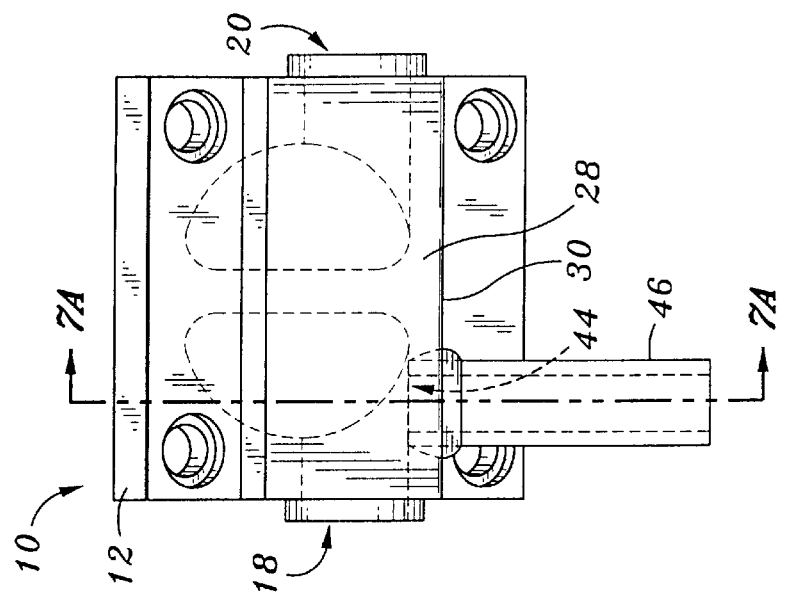
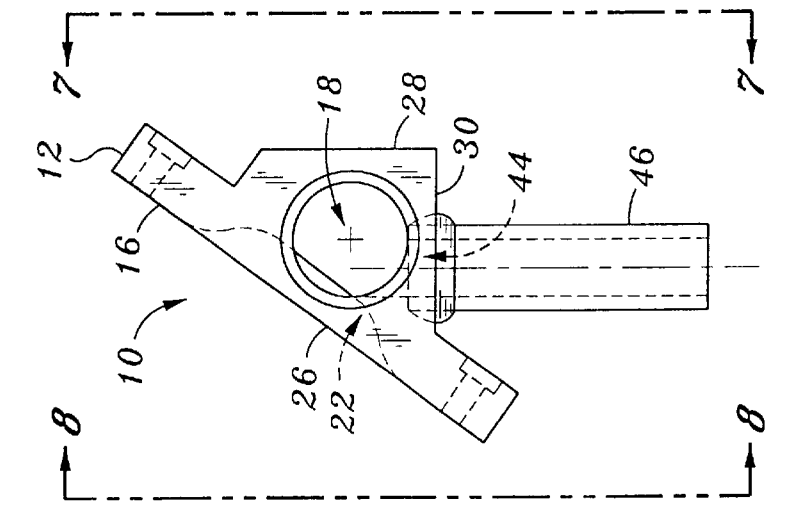
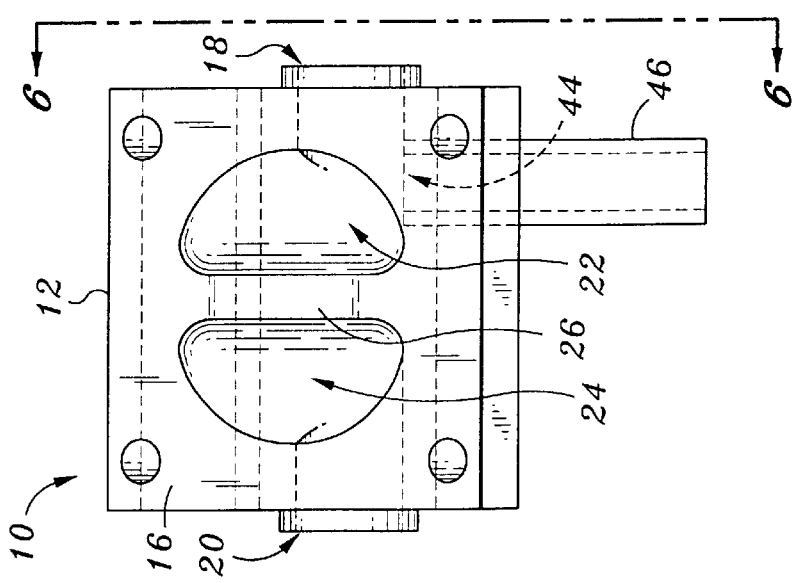

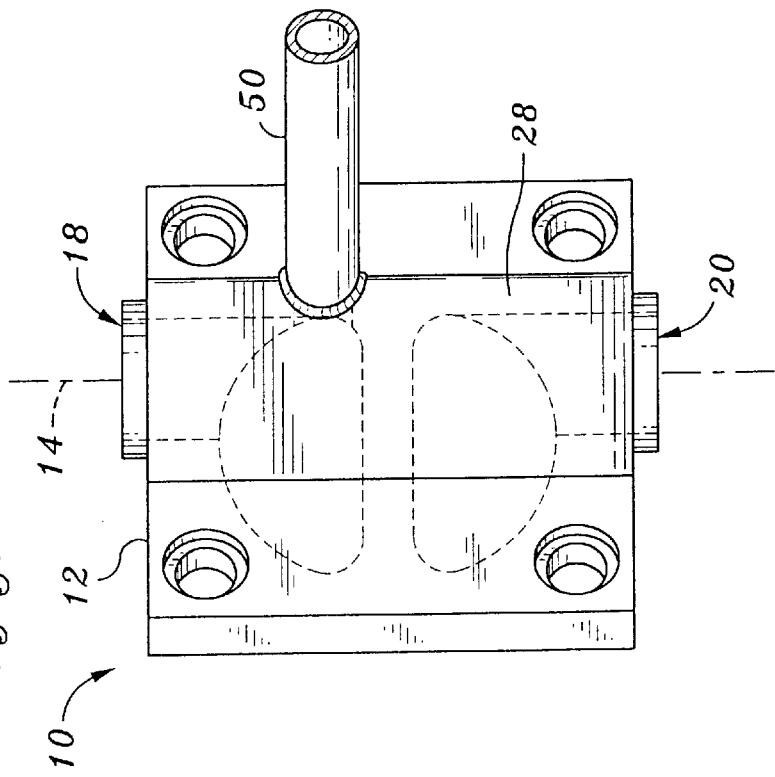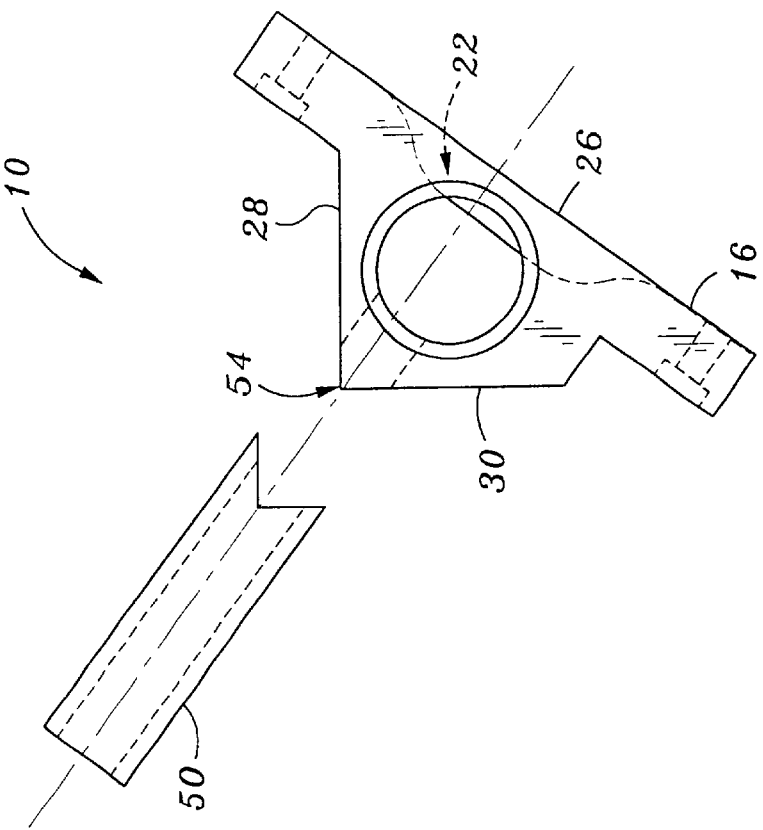

MULTI-USE STERILE ACCESS/GMP DIAPHRAGM VALVE HOUSING

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to fluid valves, and more particularly to a diaphragm type valve housing usable in sterile access and GMP orientations.

A diaphragm type main flow valve includes a valve housing body. The valve housing body has an inlet port which connects with an upstream passage which extends into the valve housing body. The valve housing body further has a downstream passage which is aligned with the upstream passage. The downstream passage extends to an outlet port. A main flow valve mounting surface is formed upon the valve housing body. A main flow valve weir is formed in the valve housing body adjacent the main flow valve mounting surface, and separates the upstream and downstream passages. A diaphragm type valve housing may be mounted upon the main flow valve mounting surface, with a diaphragm being configured to engage the main flow valve weir. Actuation of the diaphragm against the main flow valve weir prevents fluid flow between the upstream and downstream passages thereby closing the valve. As such, with the diaphragm in a closed position, fluid flow from the upstream passage is prevented from entering into the downstream passage. With the diaphragm in an open position, the downstream passage is in fluid communication with the upstream passage for passage of fluid flow from the upstream passage. In this regard, the main flow valve is intended to control fluid flow in a product distribution loop to which it is attached.

For a variety of reasons, it is often desirable to fluidly communicate directly with the main flow valve. An access port may be formed in the main flow valve housing body to gain fluid communication with either the upstream or downstream passages. In this regard, with the diaphragm of the main flow valve in the closed position, fluid flow is allowed to pass into the upstream passage an through such an access port. Alternatively, with the diaphragm of the main flow valve in the open position, fluid flow is allowed to pass into the downstream passage and through such an access port. Connecting to the access for may be a sampling valve for obtaining product samples from the distribution loop for example. A branch connection may be attached to the access port to divert flow from a main flow line in which the main flow valve is disposed. In another common arrangement, a purge valve may be attached to the access port for purging the main flow valve.

These valve arrangements have application in a wide range of fluid handling systems, such as those for pharmaceutical, biotech processing, food and beverage, and cosmetic and consumer products applications. Such applications are typically subject to strict governmental regulations and industry practices and procedures. Of interest is the cleanliness and sterility of the downstream passage of the main flow valve housing body and any attached structures at the access port (e.g., tubing to a sampling valve or purge valve, or branch connection tubing). In this regard, efficient gravitational drainage of the downstream passage and any such attached structures at the access port is of particular concern.

The interior drainage design characteristics of the downstream passage is dependent upon the orientation of the overall main flow valve and attached structure that is to be installed. Those valve arrangements which are designed to be utilized with the upstream and downstream passages of the main flow valve housing body arranged horizontally are referred to as sterile access valves. Those valve arrangements which are designed to be utilized with the upstream and downstream passages of the main flow valve housing body arranged vertically are referred to as GMP (good manufacturing practices) valves.

Those responsible for maintaining fluid product handling systems must typically carry dedicated inventories of both sterile access and GMP valves. This is because sterile access valves and GMP valves are not interchangeable due to their particular configurations associated with desired drainage when utilized in their intended orientations. As such valves generally perform the same function, however, utilization of two different valve housing designs is inefficient. Accordingly, there is a need in the art for an improved main flow valve housing design in comparison to the prior art.

BRIEF SUMMARY OF THE INVENTION

In accordance with an embodiment of the present invention, there is provided a multi-use sterile access/GMP diaphragm valve housing. The housing has a valve housing block having a main flow axis. The housing further has a main flow valve mounting surface formed upon the valve housing block parallel to the main flow axis. The housing further has a first port and an opposing second port each respectively formed in the valve housing block aligned along the main flow axis. The housing further has a first passage extending from the first port to the main flow valve mounting surface. The housing further has a second passage extending from the main flow valve mounting surface to the second port. The housing further has a main flow weir disposed adjacent the main flow valve mounting surface between the first and second passages for controlling flow between the first and second passages. The housing further has first and second planar lands formed upon the valve housing block adjacent the first passage for forming a third passage through a respective one of the lands in fluid communication with the first passage. The first and second planar lands is disposed orthogonal to each other and parallel to the main flow axis. In practice, the first passage may be an upstream passage which may be attached to a product distribution loop. As such, the second passage would be a downstream passage. In this regard, such third passage could be used to divert fluid flow to a sampling valve.

In an embodiment of the housing, the main flow valve mounting surface is disposed between about 45 degrees to about 10 degrees with respect to the first and second planar lands. Further, the first and second planar lands abut each other, and the first and second planar lands extend along the valve housing block adjacent the first and second passages.

According to another aspect of the present invention, there is provided a method of use of a multi-use sterile access/GMP diaphragm valve housing in a sterile access orientation. The method begins with providing a diaphragm valve housing as generally described above. A third passage is formed through a respective one of the lands extending to a lowestmost portion of the first passage. Tubing is attached to the third passage adjacent the respective one of the lands. The housing is aligned in a sterile access orientation with the main flow axis disposed horizontally. Further, the third passage may be formed tangentially with the first passage and the housing may be aligned with the tubing being horizontal. Alternately, the housing may be aligned with the tubing being vertical.

According to another aspect of the present invention, there is provided a method of use of a multi-use sterile access/GMP diaphragm valve housing in a GMP orientation. The method begins with providing a diaphragm valve housing as generally described above. A third passage is formed through a respective one of the lands extending to a lowestmost portion of the first passage. Tubing is attached to the third passage adjacent the respective one of the lands. The housing is aligned in a GMP orientation with the main flow axis disposed vertically. Further, the third passage may be formed tangentially with the main flow weir. The housing may be aligned with the tubing being horizontal. The first and second planar lands may abut each other at an abutting edge, and the third passage may be formed through the abutting edge. A v-cut may be formed in an end of the tubing, and the end of the tubing may be attached with the v-cut at the abutting edge.

As such, based on the foregoing, the present invention mitigates the inefficiencies and limitations associated with prior art arrangements. In particular, as mentioned above, the housing may be subsequently manufactured to be utilized in a sterile access orientation with the main flow axis disposed horizontally. In this regard, the third passage may be formed through a respective one of the lands to extend to the first passage. The housing may be used with the first passage being an upstream passage. Tubing may be attached to the third passage which may be utilized for connection with a sampling valve. The tubing may conveniently be configured in various orientations such as horizontally and vertically. Advantageously, in an embodiment of the housing, the main flow valve mounting surface is disposed angularly with respect to the first and second planar lands, such as between about 45 degrees to about 10 degrees. Such angulation is contemplated to be selected depending upon a desired drain angle. As such, the valve housing design of the present invention facilitates drainage of the first passage, the adjoining third passage and the connecting tubing in such orientations. This is because the third passage may be formed to extend to the lowestmost portion of the first passage. Further, the housing may be formed subsequently manufactured to be utilized in a GMP orientation with the main flow axis disposed vertically. The third passage may be formed through a respective one of the lands extending to a lowestmost portion of the first passage. As such, the valve housing design of the present invention facilitates drainage of the first passage, the adjoining third passage and the connecting tubing. Thus, such valve housing design of the present invention avoids having to produce and inventory two different valve housing parts in favor of a single multi-use valve housing of the present invention because such housing may be subsequently machined into either a sterile access configuration or a GMP configuration.

Moreover, the present valve housing design facilitates formation of the third passage orthogonally through the lands. This facilitates ease of attachment of the tubing thereto. In an embodiment as discussed above, such tubing may include a v-cut at the end of the tubing for attachment. Attachment is contemplated to be relatively easy in comparison to attachment to prior art valve housing structures which may have a curved surface at the desired point of attachment.

Accordingly, the present invention represents a significant advance in the art.

BRIEF DESCRIPTION OF THE DRAWINGS

These, as well as other features of the present invention, will become more apparent upon reference to the drawings wherein:

FIG. 1 is a perspective view of a multi-use sterile access/GMP diaphragm valve housing with a main flow valve mounting surface shown (with a main flow path shown in dashed lines) as shown in a sterile access orientation according to an embodiment of the present invention;

FIG. 2 is another perspective view of the housing of FIG. 1 as shown from a reverse angle;

FIG. 3 is a side view of housing of FIG. 1 as additionally shown with a third passage formed therein (shown in phantom) and attached tubing in a horizontal configuration;

FIG. 4 is plan view of the housing of FIG. 3 as seen along axis 4—4;

FIG. 4a is cross-sectional view of the housing of FIG. 4 as seen along axis 4a—4a as additionally shown with an attached diaphragm housing;

FIG. 5 is plan view of the housing of FIG. 3 as seen along axis 5—5;

FIG. 6 is a side view of the a multi-use sterile access/GMP diaphragm valve housing as shown in a sterile access orientation shown with a third passage formed therein (shown in phantom) and attached tubing in a vertical configuration according to another embodiment of the present invention;

FIG. 7 is plan view of the housing of FIG. 6 as seen along axis 7—7;

FIG. 7a is cross-sectional view of the housing of FIG. 7 as seen along axis 7a—7a as additionally shown with an attached diaphragm housing;

FIG. 8 is plan view of the housing of FIG. 6 as seen along axis 8—8;

FIG. 11 is a top view of the housing of FIG. 10 as shown with a tubing detached from the housing; and FIG. 12 is a side view of the housing of FIG. 10 as seen along axis 12—12.

DETAILED DESCRIPTION OF THE INVENTION

Figure 10:
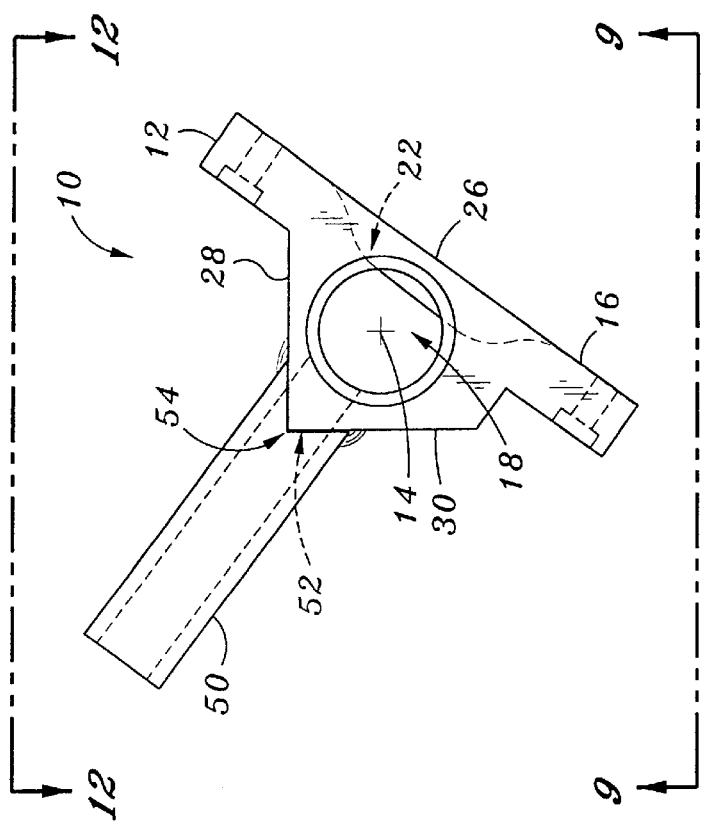
FIG. 10 is a top view of the housing of FIG. 9 as seen along axis 10—10.

Referring now to the drawings wherein the showings are for purposes of illustrating a preferred embodiment of the present invention only, and not for purposes of limiting the same, FIGS. 1–4, 4a, 5–7, 7a, and 9–12 illustrate preferred embodiments of a multi-use sterile access/GMP diaphragm valve housing and method of use thereof according to aspects of the present invention.

Referring now to FIGS. 1 and 2 there is depicted a multi-use sterile access/GMP diaphragm valve housing 10 according to a first embodiment of the present invention. The housing 10 has a valve housing block 12 having a main flow axis 14. FIG. 1 is a perspective view of the housing 10 as shown in a sterile access orientation. FIG. 2 is another perspective view of the housing 10 of FIG. 1 as shown from a reverse angle. The housing 10 further has a main flow valve mounting surface 16 formed upon the valve housing block 12 parallel to the main flow axis 14. The housing 10 further has a first port 18 and an opposing second port 20 each respectively formed in the valve housing block 12 aligned along the main flow axis 14. The housing 10 further has a first passage 22 extending from the first port 18 to the main flow valve mounting surface 16. The housing 10 further has a second passage 24 extending from the main flow valve mounting surface 16 to the second port 20. The housing 10 further has a main flow weir 26 disposed adjacent the main flow valve mounting surface 16 between the first and second passages 22, 24 for controlling flow between the first and second passages 22, 24. The housing 10 further has first and second planar lands 28, 30 formed upon the valve housing block 12 adjacent the first passage 22 for forming a third passage (denoted 32 in the embodiment shown in FIGS. 3, 4, 4a and 5; denoted 44 in the embodiment shown in FIGS. 6, 7, 7a and 8; and denoted 48 in the embodiment shown in FIGS. 9–12) through a respective one of the lands 28, 30 in fluid communication with the first passage 22. The first and second planar lands 28, 30 are disposed orthogonal to each other and parallel to the main flow axis 14.

A main flow path 34 is formed through the valve housing 10 (as symbolically shown in dashed lines). Such main flow path 34 may begin at the first port 18, and continues into the first passage 22, over the main flow weir 26, into the second passage 24, and finally through the second port 20. In this regard, in the configuration shown, the first port 18 and the first passage 22 are upstream in nature with respect to the second passage 24 and the second port 20 which are downstream in nature.

Referring now additionally to FIGS. 3, 4, 4a and 5, there is depicted the housing 10 of FIGS. 1 and 2 as modified to include a third passage 34. In this embodiment, the third passage 34 is formed orthogonal to and through the first planar land 28. Tubing 42 may be weld attached to the housing block 12 in fluid communication with the third passage 34. In the case where the first passage 22 is an upstream passage, the third passage 34 and tubing 42 may be utilized for attachment to a sampling valve for example. As such, a sampling conduit or flow path is formed through the housing 10. Referring now to FIG. 4a, there is depicted a cross-sectional view of the housing 10 as seen along axis 4a—4a of FIG. 4 with an illustrative portion of the sampling flow path is shown in dashed lines. Such sampling flow path begins at the first passage 22 and into the third passage 32 and into the tubing 42.

As shown in FIG. 4a, the housing 10 is contemplated to be utilized with a main flow diaphragm housing 36 such as shown in FIG. 4a. The main flow diaphragm housing 36 is configured to be mounted to the valve housing block 12 at the main flow valve mounting surface 16. The main flow diaphragm housing 36 is provided with a main flow diaphragm 38 and a main flow diaphragm actuator 40. Actuation of main flow diaphragm 38 by the main flow diaphragm actuator 40 regulates flow between the first and second passages 22, 24. As such, the main flow diaphragm 38 is shown in an open position, thereby allowing fluid flow between the first and second passages 22, 24 over the main flow weir 26.

Advantageously, usage of the diaphragm valve housing 10 of the present invention is intended to not be directionally dependent. In this regard, the first and second passages 22, 24 and the first and second planar lands 28, 30 are particularly formed for facilitating fluid drainage when the diaphragm valve housing 10 is modified to include a third passage (denoted 32 in the embodiment shown in FIGS. 3, 4, 4a and 5; denoted 44 in the embodiment shown in FIGS. 6, 7, 7a and 8; and denoted 48 in the embodiment shown in FIGS. 9–12) as discussed below and is oriented in either the sterile access orientation (as shown in FIGS. 1–4, 4a, 5–7, 7a and 8) or GMP orientation (as shown in FIGS. 9–12).

Referring now to the side view of the diaphragm valve housing 10 as shown in FIG. 3, the first passage 22 extends horizontally from the first port 18 into the valve housing block 12. As shown, the first passage 22 is formed to have a cylindrical shape adjacent to and extending from the first port 18. As seen in another side view of FIG. 5, the first passage 22 is curved and has a dog leg shape as it flanges outward towards the main flow mounting surface 16 adjacent the main flow weir 26. The first passage 22 opens to the main flow valve mounting surface 16. As seen in FIG. 5, the first passage 22 has a capital D-shaped cross section adjacent the main flow valve mounting surface 16. The second passage 24 and second port 20 are formed similarly to the first passage 24 and first port 18. Other shapes and cross-sectional configurations of the first and second passages 22, 24 and first and second ports 18, 20 are contemplated.

As best seen in FIG. 3, the main flow valve mounting surface is preferably disposed angularly with respect to both the first and second planar lands 28, 30 (i.e., neither parallel or perpendicular to either one of the lands 28, 30). In this regard, the main flow valve mounting surface 16 may be disposed between about 45 degrees to about 10 degrees with respect to the first and second planar lands 28, 30. Such angulation is contemplated to be selected based upon the desired drain angle when the valve housing 10 is installed in a horizontal pipe line. The drain angle may be dependent upon valve sizing, connection tube diameter and other constraints. With the valve housing 10 installed in a horizontal pipe line, the angulation is designed such that the valve housing 10 may be axially rotated such that a horizontal plane passes through both the lowermost portion of the first and second passages 22, 24 and the lowermost portion of the main flow weir 26. The drain angle is the resulting angle between the horizontal plane and a line normal to the main flow valve mounting surface 16. Once a desired drain angle is determined the relative geometry of the orthogonal first and second planar lands 28, 30 in horizontal and vertical orientations is established. As the first passage 22 extends from the first port 18, the tubing 42 may be configured to be tangent to the first port 18 when viewed axially from the perspective of the first port 18. In this regard, the tubing 42 may be attached to the third passage 32 such the tubing 42 is disposed horizontally or even angled downward for facilitating drainage out of the valve housing block 12 through the third passage 32. As such, the valve housing design of the present invention facilitates drainage of the first passage 22, the adjoining third passage 32 and the connecting tubing 42.

Referring now to FIGS. 6, 7, 7a and 8, there is depicted another embodiment of the diaphragm valve housing 10 of the present invention. There is depicted the housing 10 of FIGS. 1 and 2 as modified to include another third passage 44. In this embodiment, the third passage 44 is formed orthogonal to and through the second planar land 30. Tubing 46 may be provided which is weld attached to the housing block 12 in fluid communication with the third passage 44. By forming the third passage 44 through the second planar land 30, the tubing 46 may be aligned vertically. In the case where the first passage 22 is an upstream passage, the third passage 44 and tubing 46 may be utilized for attachment to a sampling valve for example. As such, a sampling conduit or flow path is formed through the housing 10. Referring now to FIG. 7a, there is depicted a cross-sectional view of the housing 10 as seen along axis 7a—7a of FIG. 7 with an illustrative portion of the sampling flow path is shown in dashed lines. Such sampling flow path begins at the first passage 22 and downward into the third passage 44 and into the tubing 46. The third passage 44 is preferably formed to intersect the lowestmost portion of the first passage 22 to facilitate drainage thereof.

Figure 9:
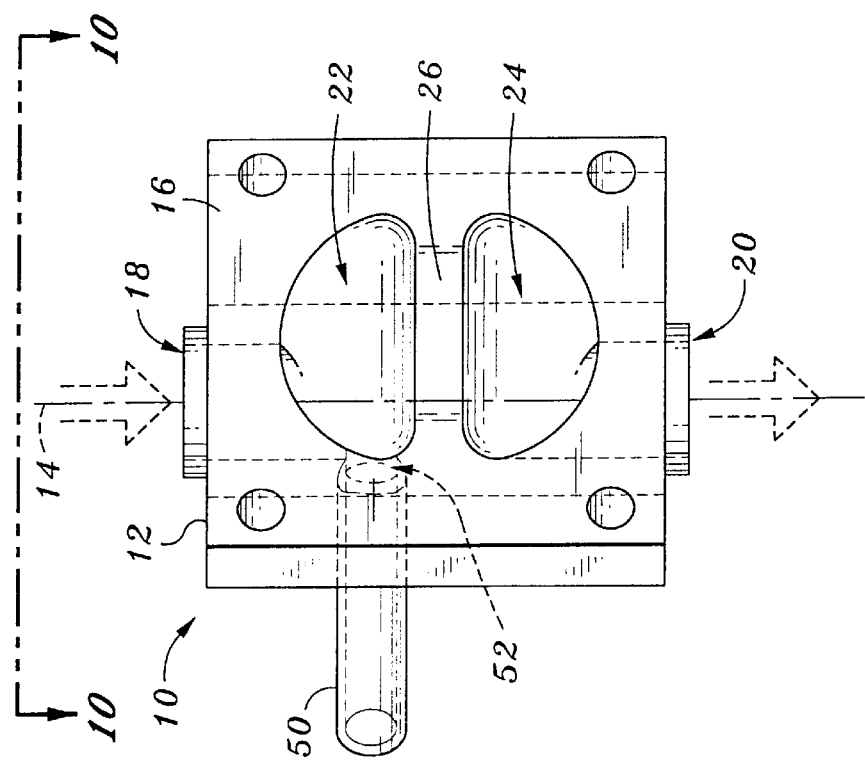
FIG. 9 is a side view of a multi-use sterile access/GMP diaphragm valve housing as shown in a GMP access orientation according to an embodiment of the present invention.

As mentioned above, the valve housing 10 may be utilized in a GMP access orientation as shown in FIGS. 9–12. Referring now additionally to FIGS. 9–10, there is depicted the housing 10 of FIGS. 1 and 2 as modified to include a third passage 48. FIG. 9 is a side view of diaphragm valve housing 10. FIG. 10 is a top view of the housing 10 of FIG. 9 as seen along axis 10—10. FIG. 12 is a side view of the housing 10 of FIG. 10 as seen along axis 12—12. There is depicted the housing 10 of FIGS. 1 and 2 as modified to include another third passage 48. In this embodiment, the housing 10 may be aligned with the main flow axis 14 aligned vertically and the main flow weir 26 aligned horizontally. In the case where the first passage 22 is an upstream passage, a main flow path would enter the first port 18, flow downward into the first passage 22, over the main flow weir 26, into the second passage 24, and out the second port 20.

As mentioned above, the third passage 48 is formed through a respective one of the first and second planar lands 28, 30 in fluid communication with the first passage 22. In this regard, such third passage 48 need not be formed exclusively through a respective one of the lands 28, 30, but may be formed through both lands 28, 30 as shown in this embodiment. The first and second planar lands 28, 30 may be formed to abut each other at an abutting edge 54. The third passage 38 may be formed through the abutting edge 54. Further, the third passage 44 is preferably formed to intersect the lowestmost portion of the first passage 22 to facilitate drainage thereof. As such, the third passage 48 may be formed tangentially with the main flow weir 26.

Tubing 50 may be further provided for attachment to the third passage 48. Such tubing 50 may be utilized for attachment of a sampling valve for example. Referring now to FIG. 11, there is depicted a top view of the housing 10 of FIG. 10 as shown with a tubing 50 detached from the housing 10. A v-cut may be formed in an end 52 of the tubing 50. The end 52 may then be attached to the abutting edge 54 for allowing fluid communication through the third passage 48 into the attached tubing 50. Such attachment may be effectuated through a welding process for example. Advantageously, to the extent that the main flow valve mounting surface 16 is formed at 45 degrees with respect to both the first and second planar lands 28, 30, such a configuration would result in the tubing being aligned horizontally and orthogonal to the main flow valve mounting surface 16 after a relatively simple right angle v-cut is formed in the end 52 of the tubing 50.

It is contemplated that the first and second planar lands 28, 30 may extend along the valve housing block 12 adjacent the first and second passages 22, 24. In this regard, an additional passage (not shown) may be formed similar to the third passage (in any of the embodiments such as 32, 44, 48) adjacent the second passage 24. Such additional passage may be utilized for such purposes as attachment to sampling or purge valve arrangements.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A multi-use sterile access/GMP diaphragm valve housing comprising:

a valve housing block having a main flow axis;

a main flow valve mounting surface formed upon the valve housing block parallel to the main flow axis;

a first port and an opposing second port each respectively formed in the valve housing block aligned along the main flow axis;

a first passage extending from the first port to the main flow valve mounting surface;

a second passage extending from the main flow valve mounting surface to the second port;

a main flow weir disposed adjacent the main flow valve mounting surface between the first and second passages for controlling flow between the first and second passages; and first and second planar lands formed upon the valve housing block adjacent the first passage for forming a third passage through a respective one of the lands in fluid communication with the first passage, the first and second planar lands being disposed orthogonal to each other and parallel to the main flow axis.

2. The diaphragm valve housing of claim 1 wherein main flow valve mounting surface is disposed between about 45 degrees to about 10 degrees with respect to the first and second planar lands.

3. The diaphragm valve housing of claim 1 wherein the first and second planar lands abut each other.

4. The diaphragm valve housing of claim 1 wherein the first and second planar lands extend along the valve housing block adjacent the first and second passages.

5. A method of use of a multi-use sterile access/GMP diaphragm valve housing in a sterile access orientation, the method comprising:

(a) providing the diaphragm valve housing, the housing having a valve housing block having a main flow axis, the housing further having a main flow valve mounting surface formed upon the valve housing block parallel to the main flow axis, the housing further having a first port and an opposing second port each respectively formed in the valve housing block aligned along the main flow axis, the housing further having a first passage extending from the first port to the main flow valve mounting surface, the housing further having a second passage extending from the main flow valve mounting surface to the second port, the housing further having a main flow weir disposed adjacent the main flow valve mounting surface between the first and second passages for controlling flow between the first and second passages, the housing further having first and second planar lands disposed orthogonal to each other and parallel to the main flow axis;

(b) forming a third passage through a respective one of the lands extending to a lowestmost portion of the first passage;

(c) attaching tubing to the third passage adjacent the respective one of the lands; and (d) aligning the housing in a sterile access orientation with the main flow axis disposed horizontally.

6. The method of claim 5 wherein (b) the third passage is formed tangentially with the first passage.

7. The method of claim 5 wherein (d) the housing is aligned with the tubing being horizontal.

8. The method of claim 5 wherein (d) the housing is aligned with the tubing being vertical.

9. A method of use of a multi-use sterile access/GMP diaphragm valve housing in a GMP orientation, the method comprising:

(a) providing the valve housing, the housing having a valve housing block having a main flow axis, the housing further having a main flow valve mounting surface formed upon the valve housing block parallel to the main flow axis, the housing further having a first port and an opposing second port each respectively formed in the valve housing block aligned along the main flow axis, the housing further having a first passage extending from the first port to the main flow valve mounting surface, the housing further having a second passage extending from the main flow valve mounting surface to the second port, the housing further having a main flow weir disposed adjacent the main flow valve mounting surface between the first and second passages for controlling flow between the first and second passages, the housing further having first and second planar lands disposed orthogonal to each other and parallel to the main flow axis;

(b) forming a third passage through a respective one of the lands extending to a lowestmost portion of the first passage;

(c) attaching tubing to the third passage adjacent the respective one of the lands; and (d) aligning the housing in a GMP orientation with the main flow axis disposed vertically.

10. The method of claim 9 wherein (b) the third passage is formed tangentially with the main flow weir.

11. The method of claim 9 wherein (d) the housing is aligned with the tubing being horizontal.

12. The method of claim 9 wherein the first and second planar lands abut each other at an abutting edge, the third passage is formed through the abutting edge.

13. The method of claim 12 wherein (c) further comprises forming a v-cut in an end of the tubing, attaching the end of the tubing with the v-cut at the abutting edge.

* * * * *